United States Patent [19]
Talbot et al.

[11] Patent Number: 5,157,905
[45] Date of Patent: Oct. 27, 1992

[54] SUPPORT LINKAGE FOR MOUNTING A HEADER ON A SUPPORT FRAME

[75] Inventors: Francois R. Talbot; Thomas R. Fox, both of Manitoba, Canada

[73] Assignee: MacDon Industries Ltd., Winnipeg, Canada

[21] Appl. No.: 692,554

[22] Filed: Apr. 29, 1991

[51] Int. Cl.⁵ ............................................ A01D 67/00
[52] U.S. Cl. ........................................ 56/15.9; 56/208
[58] Field of Search ...................... 56/14.9, 15.1, 15.2, 56/15.7, 15.8, 15.9, 208, 209, DIG. 14

[56] References Cited

U.S. PATENT DOCUMENTS

| | | | |
|---|---|---|---|
| 3,808,781 | 5/1974 | Bass et al. | 56/15.8 |
| 4,724,661 | 2/1988 | Blakeslee et al. | 56/15.8 X |

FOREIGN PATENT DOCUMENTS 869628 10/1981 U.S.S.R. ............................ 56/208

Primary Examiner—David J. Bagnell
Attorney, Agent, or Firm—Adrian D. Battison; Stanley G. Ade; Murray E. Thrift

[57] ABSTRACT

The header support linkage of a swather header on a support frame of a swather comprises a substantially vertical beam, an upper cross arm formed from a channel and a lower support cradle arm projecting outwardly from the bottom of the beam. A lower link projects from the frame forwardly to engage the lower part of the beam and is formed by an expandable cylinder to lift the header. An upper link extends from an upper part of the frame along the inside of the channel forming the upper arm. A cylinder extends from a lower part of the frame to a lever pivotally connected to the upper link providing a lost motion connection. An adjustable stop is provided between the upper link and the inside of the upper arm. A float spring is connected between an outer end of the upper arm and a vertically adjustable slide provided on the frame. The linkage provides adjustment for different header weights and an effective lifting action of the header from a preset cut height to a raised position both by a lifting action and by a floating action.

19 Claims, 2 Drawing Sheets

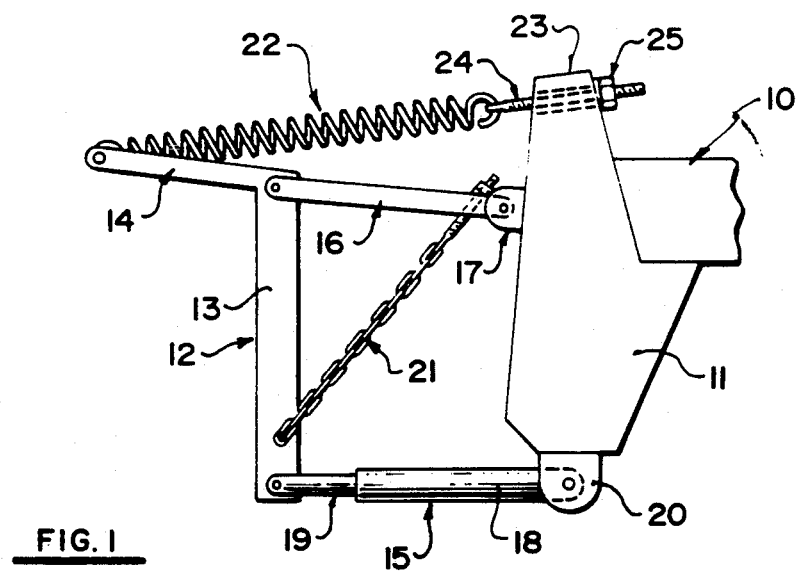
FIG. 1
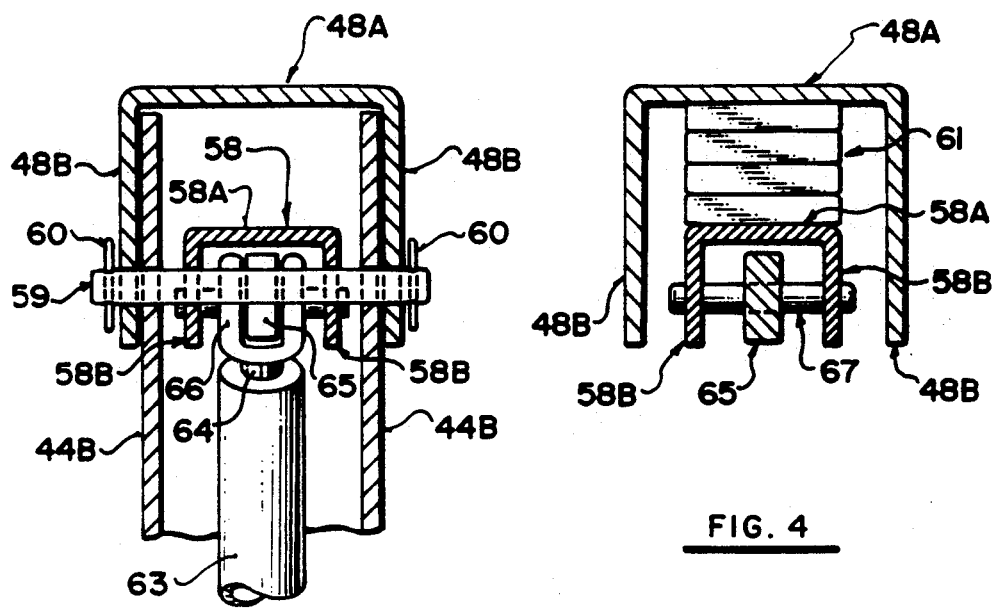
FIG. 3
FIG. 4

SUPPORT LINKAGE FOR MOUNTING A HEADER ON A SUPPORT FRAME

BACKGROUND OF THE INVENTION

This invention relates to a support linkage for supporting a header on a support frame of a crop harvesting machine.

The present invention is particularly but not exclusively designed for use with swathers, which may be of the self propelled or pulled variety.

Self propelled swathers generally comprise a tractor unit which has a frame carried by a pair of driven front wheels which straddle the swath and hence are positioned at respective sides of the driver platform so as to extend downwardly therefrom. Conventionally the wheels are driven by hydraulic motors mounted at a lower end of the wheel support struts. The rear wheels supporting the frame are generally castor wheels which are positioned at the rear of the platform and again spaced widely to straddle the swath. Pull-type swathers include a frame mounted on a pair of spaced ground wheels with the frame attached to a hitch pole for connection to a separate tractor unit.

In both cases the frame is designed to accomodate different headers which can vary significantly in width and weight depending upon the crop and depending upon the land conditions. It is necessary therefore for the swather frame to be designed to accomodate headers of significantly different weight and to allow adjustment of the cutting height of the header. Furthermore the header must be mounted so that it can float, that is it can fall to a required cutting height but can lift away from that height if it comes into engagement with the ground or with any other obstacle to prevent damage. In addition the header must be raisable under control of the operator so that it can be raised from certain obstacles and so that it can be lifted away from the ground for transportation when inoperative.

Various designs of support linkage have previously been proposed for holding the header relative to the frame in a manner which accomodates the above requirements. Generally the linkage includes left and right linkages each seperately connected to the frame. Generally each support linkage comprises a top link, a bottom link and a float spring arrangement which tends to lift the header around the pivotal links from a lower stop position to enable the header to float away from contact with any obstacle on the ground. One example of the prior art is described hereinafter.

However the designs previously put forward have had a number of limitations and disadvantages and it is one object of the present invention to provide an improved design of support linkage of this general type.

SUMMARY OF THE INVENTION

According to the first aspect of the invention there is provided a header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axes, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom links so as to apply a lifting force on said bracket tending to pivot both said top and bottom links in an upward direction relative to the frame, and means for adjusting upwardly and downwardly the point of connection of the spring means on the frame so as to vary the spring effect applied by the float spring means to the bracket to accomodate headers of different weight on the bracket.

According to a second aspect of the invention there is provided a header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axes, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom links so as to apply a lifting force on said bracket tending to pivot both said top and bottom links in an upward direction relative to the frame, said limiting means comprises an arm rigidly connected to said bracket and extending therefrom to a position adjacent said second pivot connection and stop means engaging between said arm and said top link.

According to a third aspect of the invention, there is provided a header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axes, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom links so as to apply a lifting force on said bracket tending to pivot both said top and bottom links in an upward direction relative to the frame, a height adjustment device comprising a cylinder and piston arrangement having a first end connection and a second opposed end connection which are extendable and retractable by operation of the cylinder, the first end connection being connected to said frame and the second end connection being connected to said top link for raising and lowering the top link, and lost motion connection means allowing lifting movement of the top link upwardly from said second connection.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view showing schematically a support structure for a header mounted upon a frame and showing a prior art arrangement.

FIG. 3 is a cross-sectional view along the lines 3—3 of FIG. 2.

FIG. 4 is a cross-sectional view along the lines 4—4 of FIG. 2.

In the drawings like characters of reference indicate corresponding parts in the different figures.

DETAILED DESCRIPTION

Figure 2:
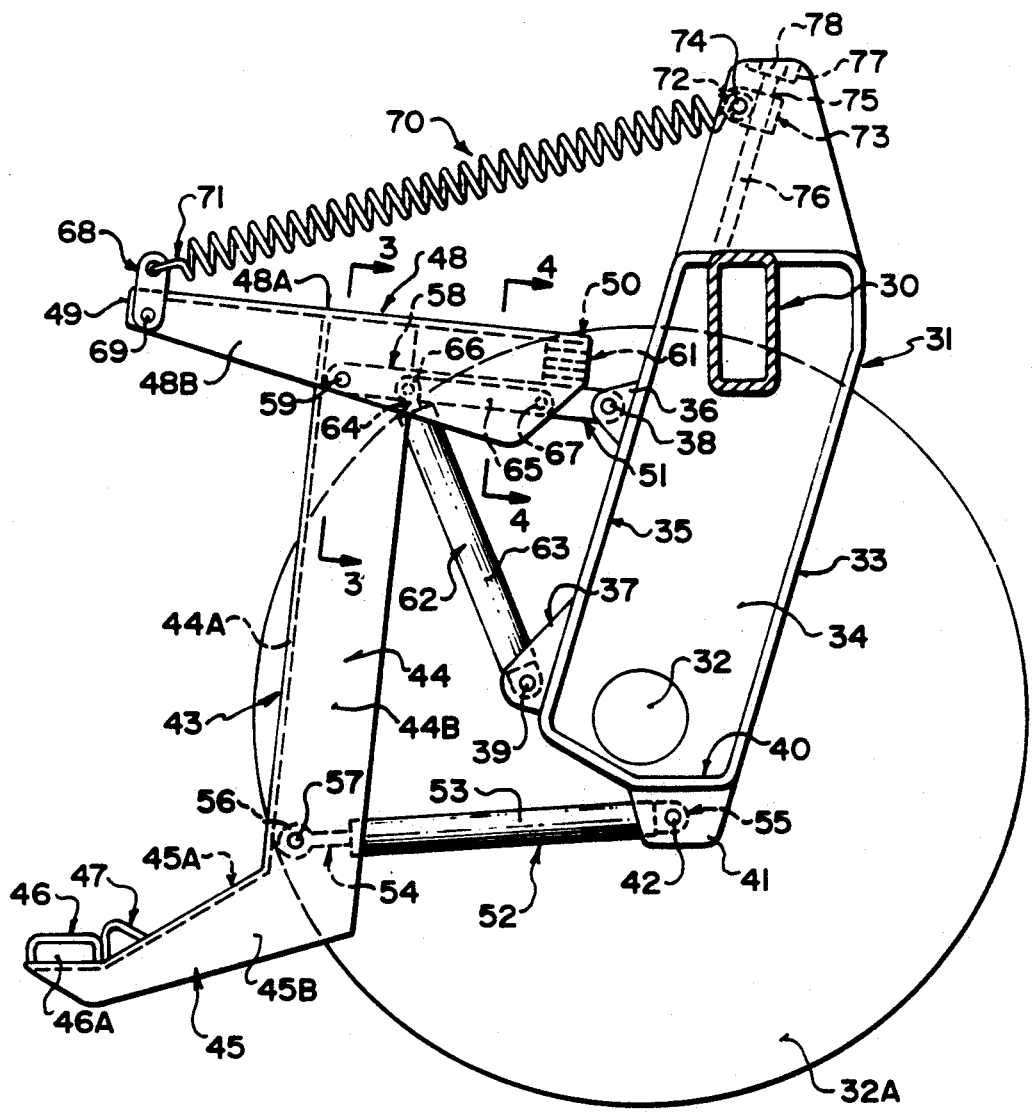
FIG. 2 is a similar side elevational view of a support linkage according to the present invention.

The embodiments shown herein comprises a self propelled swather with an attached dedicated tractor unit, but it will be appreciated that substantially the same design of linkage can be used with a frame of a pull-type swather (not shown).

As described above a conventional frame for supporting a header of the type with which the present invention is concerned comprises a driver platform mounted upon a pair of spaced front wheels which are carried on struts extending downwardly from the platform at positions spaced across the front of the platform. Rear wheels are provided at rear corners of the platform and generally these are castor wheels. Each strut for a respective one of the front wheels carries a support linkage for supporting the header across the front of the frame. For convenience of illustration, therefore, and as the details are well known to one skilled in the art, the structure of the header itself and the main part of the frame are both omitted from the drawings. The drawings show only therefore a single one of the support linkages and it will be appreciated that the support linkage shown is associated with a second linkage which is identical to the first together with a central top support coupling of a conventional nature to support the header on the frame.

As shown in the prior art device illustrated in FIG. 1, the frame is generally indicated at 10 and includes a downwardly depending strut 11 for attachment to a wheel hub (not shown). The header (not shown) is mounted upon a header support member 12 which includes a vertical beam 13 with the header defining a horizontal upper arm 14 which projects forwardly from a top end of the beam 13. The mounting system for the header on the beam is not shown but it will be appreciated that the header is rigidly attached to the beam so as to be movable therewith.

The beam 13 is coupled to the strut 11 by a lower link 15 and by an upper link 16. The upper link 16 is pivotally coupled to the upper end of the beam 13 and extends rearwardly therefrom to a clevis 17 within which a rear end of the link 16 is pivotally mounted. The lower link 15 is provided by a piston and cylinder arrangement including a cylinder 18 and a piston rod 19 which can be extended and retracted in conventional manner. The piston rod is coupled at the front end to the lower end of the beam 13. The cylinder is coupled at its rear end to a clevis 20 carried on a bottom edge of the strut 11. A diagonal chain 21 is coupled to the upper link 16 at the end near the clevis 17 and extends therefrom to a position adjacent the lower end of the beam 13. The chain can thus become slack if the distance between the lower end of the beam and the clevis is reduced but when tightened holds the triangle defined by the link 16, the beam 13 and the chain 21 as a fixed triangle.

A spring 22 is connected between a suitable location on the linkage or the header, for example (as shown) a forward end of the arm 14, and an upwardly projecting mounting member 23 of the frame 10 so that the spring is inclined upwardly and rearwardly and thus applies a spring force tending to pivot the links 15 and 16 in a clockwise direction around the respective pivots. The spring force therefore counteracts the weight of the header and provides a floating action for the header on impact with any obstacle.

The header is thus floated vertically since the double link arrangement tends to move the beam 13 in the vertical direction. During this floating action, the chain 21 becomes slack to allow the beam 13 to rise. The position of the chain 21 can be adjusted by a suitable screw mechanism at the upper end so as to adjust the height of the lowermost position to which the beam 13 will reach which thus constitutes the minimum as cutting height. The chain on one of the links can be adjusted to level the header (side to side) relative to the carrier frame (tractor).

To compensate for different header weights, the spring 22 must be adjusted. One mode of adjustment of the spring 22 is by increasing or decreasing the tension of the spring by a screw 24 coupled to the upper end of the spring with the screw 24 passing through a suitable collar on the member 23 and attached to a nut 25 which can be rotated to provide the necessary adjustment. Secondly the spring force can be changed by increasing or decreasing the number of springs attached between the member 23 and the arm 14.

The header is raised by extending the cylinder 18 until the diagonal chain 21 is taut thus causing the beam 13 and the link 16 to act as one and thus pivot about the clevis 17.

While this device is reasonably satisfactory, it has a number of disadvantages.

Firstly the changing of the number of springs is a difficult mechanical operation that is required if the header weight is significantly changed, for example changing from a small header to a larger size header for different crops.

Secondly the adjustment of the spring tension by increasing or decreasing the length of the spring varies the float range of the linkage. A light header will be floated by less spring force and therefore by less spring extension than a heavy header. The reduced spring extension means that float range for light headers is much less than for heavy headers.

Turning now to FIGS. 2, 3 and 4 there is shown an improved device for supporting the header on a frame. The frame is again not shown in detail but includes a main transverse beam 30 which is coupled to a wheel support strut 31 which extends downwardly from the driver platform to support a wheel hub 32A of a wheel 33. The strut 31 is formed from a fabricated tube including a back plate 33 and sides 34 extending at right angles to the back plate. From the front face 35 is provided a pair of clevises 36 and 37 projecting forwardly from the front face each defined by a pair of parallel plates and each including a respective transverse pivot pin 38 and 39. On the bottom wall 40 is attached a further clevis 41 again formed from a pair of parallel plates and a pin 42.

A header support member generally indicated at 43 includes a substantially vertical beam 44 and a bottom forwardly extending support arm 45. The arm 45 extends forwardly and downwardly and has a support 46 mounted at the lower end for attachment to the header. The support 46 includes a rubber block 46A and a loop shaped bracket 47 through which a pin can be passed from the header to retain the header on the resilient support 46. The header is thus cradled on the support member 43. Support for an upper part of the header to prevent twisting forwardly can be provided either by a further connection to the bracket or by a separate center link between the frame and the header.

The beam 44 is formed from a channel section with a front web 44A and a rear open face. The bottom arm 45 is similarly formed from a channel with an upper web 45A and a downwardly facing open face. Side walls 45B of the bottom arm are welded to side walls 44B of the channel to form a rigid construction. The header support member 43 further includes an upper arm 48 which projects from a forward end 49 positioned forwardly from the beam 44 to a rearward end 50 spaced approximately equidistant relative to the front from the web 44A. The upper arm 48 is again formed from a channel with a top web 48A and sides 48B. The channel has a width slightly greater than that of the beam 44 so that the sides 48B as best shown in FIG. 3 extend along the outside of the beam 44 and are welded thereto to form a rigid construction.

The header support member 43 is attached to the strut 31 by an upper link generally indicated at 51 and by a lower link generally indicated at 52. As shown in the prior art, the lower link 52 is formed as a cylinder 53 and a piston rod 54 with a suitable piston mounted within the cylinder and operable to expand and retract by hydraulic couplings (not shown). The rear end of the cylinder is attached by a rear coupling 55 to the pin 42. The piston rod is attached by a front coupling 56 to a pin 57 extending between the side walls 44B of the beam 44 adjacent the lower arm 45. The forward end of the piston rod and part of the cylinder can thus be received within the channel and projecting through the open rear face of the channel.

The upper link 51 comprises a rigid lever 58 which is pivoted at its rear end to the pin 38 and at its forward end to a pin 59 extending through the walls 44B and the walls 48B of the header support member 43. The pin is held in place as shown in FIG. 3 by suitable split pins 60 so that it can be removed and the lever 58 disconnected. Furthermore as shown in FIG. 3 the lever 58 is formed as a channel member having an upper web 58A and depending walls 58B.

Between the web 58A of the lever and the undersurface of the web 48A of the upper arm is provided a stop member generally indicated at 61. The stop member is formed by a plurality of shims which can be removed and increased or decreased in thickness so as to provide an adjustment of the stop member. As shown in FIG. 2, therefore, the stop member limits the relative movement between the upper arm 48 and the lever 58 in a clockwise direction. The lever 58 is substantially wholly contained within the channel defining the upper arm 48 so that the end 50 of the channel is closely adjacent the clevis 36. This provides an attractive appearance and provides a strong effective coupling between the upper link 51 and the upper part of the header support member 43.

A second cylinder and piston arrangement generally indicated at 62 is positioned between the clevis 37 and the upper link 51. Thus the cylinder and piston arrangement 62 includes a cylinder 63 and a piston rod 64. The lower end of the cylinder is coupled to the pin 39. The upper end of the piston rod 64 is coupled to a lever 65 by a clevis coupling 66 at the top end of the piston rod. The lever 65 is positioned within the channel defining the link 58 and is pivotally coupled to the link 58 by a pin 67 extending across the depending walls of the link. Thus the lever 65 defines a lost motion connection between the piston rod 64 and the link 58. Actuation of the cylinder 63 to provide extension of the piston rod thus pushes the link 58 upwardly in view of the fact that the lever 65 and the clevis 66 are retained within the channel defining the link 58. However the link 58 can lift relative to the upper end of the piston rod independantly due to the pivotal action between the lever 65 and the link 58.

A bracket 68 is attached to the end 49 of the arm 48 by a pin 69. The bracket is formed by a pair of parallel plates each connected on a respective side of the end 49 and receives the end of a spring 70 in the form of a conventional helical tension spring including looped ends 71 and 72. The end 71 passes through holes in the bracket 68. The end 72 is coupled to a sliding coupling 73 and particularly to a pin 74 thereof. The sliding coupling 73 includes a threaded bore 75 which cooperates with a fixed threaded bolt 76 carried on a support member 77 mounted upon an upper part of the vehicle frame. The bolt 76 is inclined upwardly and rearwardly. The bolt carries an upper head 78 by which the bolt can be rotated to cause vertical movement of the sliding coupling 73.

In an alternative arrangement (not shown) the forward portion of the arm 48 can be omitted and the spring connected to the beam 44. In such a case, the connection of the spring to the tractor must be moved rearwardly to allow a sufficient length of spring to provide the required range of movement.

In operation the header floats vertically under force supplied by the float spring 70 by pivotal movement of the top and bottom links about the pins 59, 38 and 57, 42 respectively. The adjustable shims 61 provide a stop member that limits downward movement of the header support member 43 but allows the header and the header support member to float upwardly if in engagement with an obstacle.

The header is raised by extension of the cylinder 52 which causes the vertical beam 44 and the top link 51 to act as one and to pivot about the pin 38. The stop member thus holds the upper arm against further movement in the clockwise direction so that the link and the beam must move together in the lifting action provided by the extension of the cylinder 53.

The springs 70 provide the floatation action and can be adjusted by moving the coupling 73 in the required direction to float various weights of headers over the desired float range without the necessity of addition of further springs or removal of any springs. This adjustment is accomplished by simultaneously changing the distance between the line of action of the spring and the effective pivot point of the links 51, 52 and by changing the spring length to change the amount of spring pull by sliding the rear coupling 73.

For heavy headers the coupling 73 is moved upwardly and away from the bracket so as to use the maximum spring energy available. For light headers the coupling 73 is moved downwardly and toward the bracket so as to give substantially the same float range as the heavy header. In practice the desired float range for small or lighter headers is slightly greater than that of large headers. The conventional technique explained above actually decreases the float range for the lighter headers which is contrary to the practical requirement.

It will be noted that the top link 51 is shorter than the bottom link 52 and that the links are not parallel. That is the spacing between the links increases so that it is wider at a position adjacent the bracket than it is adjacent the tractor. In view of this geometry that the links are not parallel and are not of the same length, the distance from the line of action of the spring to the actual effective pivot point of the bracket (the intersection point of the two links 51 and 52) increases as the header is floated upwardly. Also, in view of this geometry, the distance from the reaction of the header mass on the bracket to the effective pivot point of the bracket decreases as the header is floated upwardly. This movement of the effective pivot point downwardly thus acts to increase the moment arm to the line of action of the spring as the header moves upwardly. This increase in the moment arm together with the reduction of the spring effect as it becomes shorter and the reduction in the moment arm to the header mass ensures that the proportion of the header mass which is floated remains substantially constant over a desired float range.

The cylinder 63 together with the compound link arrangement 51, 65 provides the following features:

a) The cylinder 63 can be adjusted to set the cut height. Thus the cylinder 63 is adjusted to and fixed at the desired cutter bar height. Once the height of the cutter bar of the header is set by actuation of the cylinder 63, the cylinder 53 is operated to raise the header when required and to lower it down to the preset height. The height of one end of the header can be varied with respect to the other end of the header by changing the length of the cylinder 63 on one side relative to the other side.

b) There is a parallel header lift over the cutting range, that is, the guard and draper angle of the header are not significantly changed when the cylinder 63 is operated as this cylinder operates on a substantially parallel linkage.

c) The arrangement of the linkage allows a high header lift. The lift range at the rear of the header is limited because of interference between the front of the operator's platform (not shown) and the header frame. However by the arrangement of the linkage as shown, the lift range of the header despite the limitation of the movement at the rear of the header is sufficient to allow the guards to be raised high to give good ground clearance.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axes, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom link so as to apply a lifting force on said bracket tending to pivot both said top and bottom links in an upward direction relative to the frame, and means for adjusting upwardly and downwardly the point of connection of the spring means on the frame so as to vary the spring effect applied by the float spring means to the bracket to accomodate headers of different weight on the bracket.

2. The linkage according to claim 1 wherein said adjusting means is arranged such that the point of connection moves upwardly and rearwardly away from the bracket.

3. The linkage according to claim 1 wherein the adjusting means comprises a screw having a nut thereon defining said point of connection such that the nut is movable by rotation of the screw.

4. The linkage according to claim 1 wherein the bracket includes a substantially vertical strut, a top horizontal arm extending from the strut outwardly away from the frame and a bottom arm extending outwardly away from the frame and spaced downwardly from the top arm, said float spring means being connected between an outer end of the top arm and the frame.

5. The linkage according to claim 1 wherein the top and bottom links are different lengths and are oriented so that the effective pivot point of the bracket during upward floating movement moves away from the line of action of the spring means.

6. The linkage according to claim 1 wherein said limiting means comprises an arm rigidly connected to said bracket and extending therefrom to a position adjacent said second pivot connection and stop means engaging between said arm and said top link.

7. The linkage according to claim 6 wherein said arm comprises a channel member having a top web and a pair of vertically depending sides, the channel having an open end adjacent said second connection, said top link extending from said second connection into the channel, said stop means being positioned between said web and said top link.

8. The linkage according to claim 7 wherein the stop means comprises shim means for adjusting the angle between the top link and the channel.

9. The linkage according to claim 1 wherein the bracket includes a substantially vertical strut, a top horizontal arm extending from the strut outwardly away from the frame and a bottom arm extending outwardly away from the frame and spaced downwardly from the top arm, said float spring means being connected between an outer end of the top arm and the frame, said top arm comprising a channel member extending from a forward end of the top arm rearwardly to a position closely adjacent the second connection on the frame, the channel member having a top web and a pair of vertically depending sides to define an open bottom and an open end adjacent the second connection, the top link extending from the second connection into the open end and along the channel underneath the web, and stop means engaging between the web and the top link so as to define said limiting means for limiting downward movement of the bracket relative to the top link.

10. The linkage according to claim 1 including a height adjustment device comprising a cylinder and piston arrangement having a first end connection and a second opposed end connection which are extendable and retractable by operation of the cylinder, the first end connection being connected to said frame and the second end connection being connected to said top link for raising and lowering the top link, and lost motion connection means allowing lifting movement of the top link upwardly from said second connection.

11. The linkage according to claim 10 wherein said lost motion connection means comprises a lever having one end connected to said second end connection and an opposed end thereof connected to said top link, said lever being mounted relative to the top link so as to allow upward movement of the top link relative to the second end connection and to limit downward movement of the top link to a position dependant upon the position of the second end connection.

12. A header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axis, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom links so as to apply a lifting force on said bracket tending to pivot both said top and bottom links in an upward direction relative to the frame, said limiting means comprises an arm rigidly connected to said bracket and extending therefrom to a position adjacent said second pivot connection and stop means engaging between said arm and said top link.

13. The linkage according to claim 12 wherein said arm comprises a channel member having a top web and a pair of vertically depending sides, the channel having an open end adjacent said second connection means, said top link extending from said second connection means into the channel, said stop means being positioned between said web and said top link.

14. The linkage according to claim 12 wherein the stop means comprises shim means for adjusting the angle between the top link and the channel.

15. The linkage according to claim 12 wherein the bracket includes a substantially vertical strut, a top horizontal arm extending from the strut outwardly away from the frame and a bottom arm extending outwardly away from the frame and spaced downwardly from the top arm, said float spring means being connected between an outer end of the top arm and the frame, said top arm comprising a channel member extending from a forward end of the top arm rearwardly to a position closely adjacent the second connection on the frame, the channel member having a top web and a pair of vertically depending sides to define an open bottom and an open end adjacent the second connection, the top link extending from the second connection into the open end and along the channel underneath the web, and stop means engaging between the web and the top link so as to define said limiting means for limiting downward movement of the bracket relative to the top link.

16. The linkage according to claim 12 including a height adjustment device comprising a cylinder and piston arrangement having a first end connection and a second opposed end connection which are extendable and retractable by operation of the cylinder, the first end connection being connected to said frame and the second end connection being connected to said top link for raising and lowering the top link, and lost motion connection means allowing lifting movement of the top link upwardly from said second connection.

17. The linkage according to claim 16 wherein said lost motion connection means comprises a lever having one end connected to said second end connection and an opposed end thereof connected to said top link, said lever being mounted relative to the top link so as to allow upward movement of the top link relative to the second end connection and to limit downward movement of the top link to a position dependant upon the position of the second end connection.

18. A header support linkage for supporting a header on a frame of a crop harvesting machine comprising a bracket having attachment means thereon for supporting and moving the header therewith, a top link extending from a first pivotal connection on the bracket to a second pivotal connection on the frame, a bottom link extending from a third pivotal connection on the bracket at a position thereon spaced downwardly from the first pivotal connection to a fourth pivotal connection on the frame spaced downwardly from the second pivotal connection, each of said first, second, third and fourth pivotal connections providing pivotal movement about a respective one of four horizontal axes, means limiting downward movement of the bracket relative to the top link, the bottom link including a cylinder and piston assembly such that extension and retraction movement of the piston relative to the cylinder causes the bracket and top link jointly to pivot about said second pivot connection to raise and lower respectively the header, and float spring means connected between said bracket and a point of connection on said frame and oriented relative to said top and bottom link so as to apply a lifting force on said bracket tending to pivot both said top and bottom links in an upward direction relative to the frame, a height adjustment device comprising a cylinder and piston arrangement having a first end connection and a second opposed end connection which are extendable and retractable by operation of the cylinder, the first end connection being connected to said frame and the second end connection being connected to said top link for raising and lowering the top link, and lost motion connection means allowing lifting movement of the top link upwardly from said second connection.

19. The linkage according to claim 18 wherein said lost motion connection means comprises a lever having one end connected to said second end connection and an opposed end thereof connected to said top link, said lever being mounted relative to the top link so as to allow upward movement of the top link relative to the second end connection and to limit downward movement of the top link to a position dependant upon the position of the second end connection.

* * * * *